US010425240B2

(12) United States Patent
Crasta et al.

(10) Patent No.: US 10,425,240 B2
(45) Date of Patent: *Sep. 24, 2019

(54) UPDATING DATA OBJECTS ON A SYSTEM

(71) Applicant: International Business Machines Corporation, Armonk, NY (US)

(72) Inventors: Alol A. Crasta, Bangalore (IN); Harshal S. Patil, Bangalore (IN); Kishorekumar G. Pillai, Bangalore (IN); Christoph Raisch, Gerlingen (DE); Nishant Ranjan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 264 days.

This patent is subject to a terminal disclaimer.

(21) Appl. No.: 15/413,884

(22) Filed: Jan. 24, 2017

(65) Prior Publication Data

US 2017/0374146 A1    Dec. 28, 2017

Related U.S. Application Data

(63) Continuation of application No. 15/189,332, filed on Jun. 22, 2016, now Pat. No. 10,171,257.

(51) Int. Cl.
*H04L 29/08*    (2006.01)
*H04L 12/18*    (2006.01)
(Continued)

(52) U.S. Cl.
CPC .............. *H04L 12/185* (2013.01); *G06F 3/06* (2013.01); *G06F 3/061* (2013.01); *G06F 3/065* (2013.01);
(Continued)

(58) Field of Classification Search
CPC . H04L 12/185; H04L 47/828; H04L 67/1002; H04L 67/2842; H04L 67/1097
(Continued)

(56) References Cited

U.S. PATENT DOCUMENTS 6,557,111 B1    4/2003  Theimer et al.
6,587,921 B2    7/2003  Chiu et al.
(Continued)

FOREIGN PATENT DOCUMENTS

WO    2014116875 A2    7/2014

OTHER PUBLICATIONS

IBM, Appendix P, List of IBM Patents or Patent Applications Treated As Related, dated Jan. 24, 2017, 2 pages
(Continued)

*Primary Examiner* — Tu T Nguyen
(74) *Attorney, Agent, or Firm* — Aaron N. Pontikos

(57) ABSTRACT

A computer system includes a first server including a first data management module and a second server including a second data management module, and a first and second storage controller. The first and second storage controllers are interconnected by a network configured for reliable data multicasting. The computer system further includes a cross system manager for controlling one or more core storage functions on each of the first and second storage controllers. The computer system further includes computer program instructions to, responsive to a core storage function triggered by the cross system manager: Create a multicast group for each of the first server and the second server in the network, wherein the multicast group is created by a reliable multicast mechanism, and Multicast data write operations of each of the first server and the second server to the first storage controller and the second storage controller of the multicast group.

9 Claims, 6 Drawing Sheets

(51) Int. Cl.
  *G06F 3/06* (2006.01)
  *G06F 17/30* (2006.01)
  *G06F 16/00* (2019.01)
  *H04L 12/761* (2013.01)

(52) U.S. Cl.
  CPC .............. *G06F 3/067* (2013.01); *G06F 16/00* (2019.01); *G06F 17/30* (2013.01); *H04L 45/16* (2013.01); *H04L 67/1002* (2013.01); *H04L 67/1095* (2013.01); *H04L 67/1097* (2013.01); *H04L 67/2842* (2013.01)

(58) Field of Classification Search
  USPC ......................................................... 709/226
  See application file for complete search history.

(56) References Cited

U.S. PATENT DOCUMENTS

| | | |
|---|---|---|
| 7,626,985 B2 | 12/2009 | Wong |
| 7,760,727 B2 | 7/2010 | Henry et al. |
| 8,218,538 B1 | 7/2012 | Chidambaram et al. |
| 8,700,727 B1 | 4/2014 | Gole et al. |
| 8,732,386 B2 | 5/2014 | O'Krafka et al. |
| 8,743,872 B2 | 6/2014 | Chidambaram et al. |
| 8,819,357 B2 | 8/2014 | Vilayannur et al. |
| 8,942,139 B2 | 1/2015 | Eisenhauer et al. |
| 9,639,457 B1 | 5/2017 | Piszczek et al. |
| 2011/0004729 A1 | 1/2011 | Akkawi et al. |
| 2011/0170542 A1 | 7/2011 | Liu et al. |
| 2011/0238909 A1 | 9/2011 | Kumar et al. |
| 2014/0173017 A1* | 6/2014 | Takagi .................... H04L 67/06 709/213 |
| 2014/0281273 A1 | 9/2014 | Kalekar et al. |
| 2015/0363423 A1 | 12/2015 | Utgikar et al. |
| 2017/0373865 A1 | 12/2017 | Crasta et al. |

OTHER PUBLICATIONS

Crasta et al., "Updating Data Objects on a System", U.S. Appl. No. 15/189,332, filed Jun. 22, 2016, 29 pages.
Crasta et al., "Operating Local Caches for a Shared Storage Device", U.S. Appl. No. 15/001,274, filed Jan. 20, 2016, 33 pages.
Crasta et al., "Operating Local Caches for a Shared Storage Device", U.S. Appl. No. 15/178,826, filed Jun. 10, 2016, 30 pages.
Huang et al., "An Optimized Multicore Cache Coherence Design for Exploiting Communication Locality", Proceedings of the Great Lakes Symposium on VLSI, GLSVLSI'12, May 3-4, 2012, Salt Lake City, Utah, USA, pp. 59-62, Copyright 2012 ACM 978-1-4503-1244-8/12/05.
Li et al., "Reliable Multicast in Data Center Networks", IEEE Transactions on Computers, vol. 63, No. 8, Aug. 2014, pp. 2011-2024, © 2013 IEEE.
"High-volume, low-latency messaging designed for reliable data transport", IBM Software Products Connectivity and integration Messaging WebSphere MQ, 2 pages, printed on Jun. 1, 2016, (http://www-03.ibm.com/software/products/en/wmq-llm?S_CMP=wspace>>.
"Reliable Multicast Messaging", IBM®, Software and Services, Messaging Technologies, 1 page, printed on Jun. 1, 2016, <https://www.research.ibm.com/haifa/projects/software/rmsdk/features.html>.
"WebSphere MQ Low Latency Messaging V2.5.0/2.6.0 documentation", IBM Knowledge Center, 1 page, printed on Jun. 1, 2016, <http://www.ibm.com/support/knowledgecenter/en/SSQPD3_2.6.0/com.ibm.wllm.doc/pv_welcomev2r6e.html>.

* cited by examiner

UPDATING DATA OBJECTS ON A SYSTEM

BACKGROUND

The present invention relates generally to updating data objects and in particular to updating data objects across a storage area network.

Generally, storage network environments allow for the movement of data objects, whether from a host server to a storage server or from a storage controller to another storage controller. The movement of data objects may be necessary for a variety of reasons, including critical data protection and accessing data (e.g., asynchronous and/or synchronous replication of data, mirroring of data, live guest relocation from one server to another, etc.). For example, in the case of replicating or mirroring data, a relationship may exist between a cluster (i.e., group) of host servers or a cluster of storage controllers, wherein a primary data object is replicated into one or more replica data objects between the cluster of host servers and/or storage controllers. The replication process may be performed either synchronously or asynchronously.

SUMMARY

A computer system includes one or more computer processors, one or more computer readable storage media, a first server including a first data management module and a second server including a second data management module, and a first storage controller and a second storage controller. The first storage controller and the second storage controller are interconnected by a network. The network is configured for reliable data multicasting. The computer system further includes a cross system manager. The cross system manager controls one or more core storage functions on each of the first storage controller and the second storage controller. The computer system further includes computer program instructions stored on the one or more computer readable storage media. The computer program instructions include instructions to, responsive to a core storage function triggered by the cross system manager: Create a multicast group for each of the first server and the second server in the network, wherein the multicast group is created by a reliable multicast mechanism, and Multicast data write operations of each of the first server and the second server to the first storage controller and the second storage controller of the multicast group.

DETAILED DESCRIPTION

Figure 1:
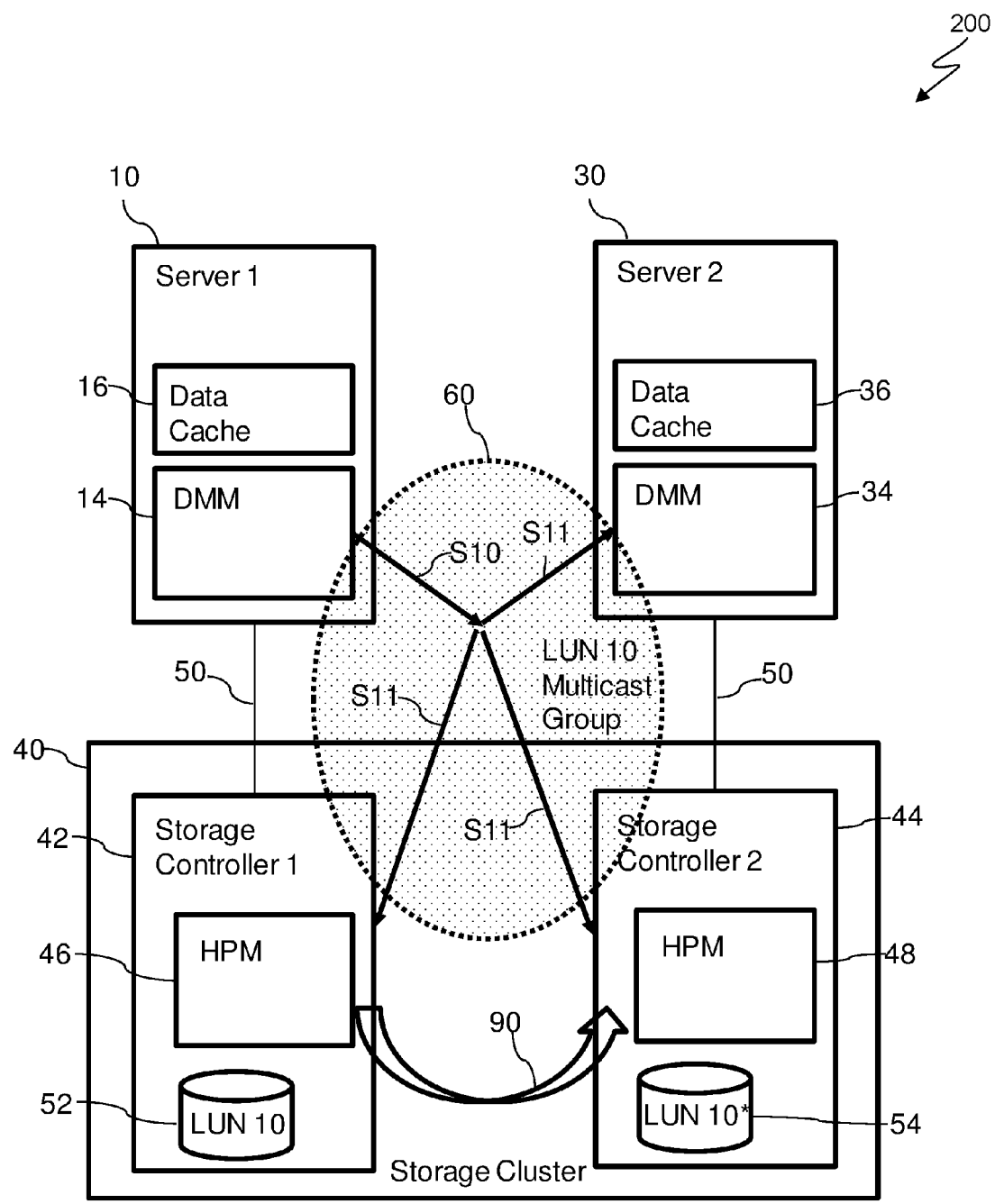
FIG. 1 is a block diagram of a system 200 suitable for updating data objects using a multicast group in accordance with at least one embodiment of the invention.
Figure 2:
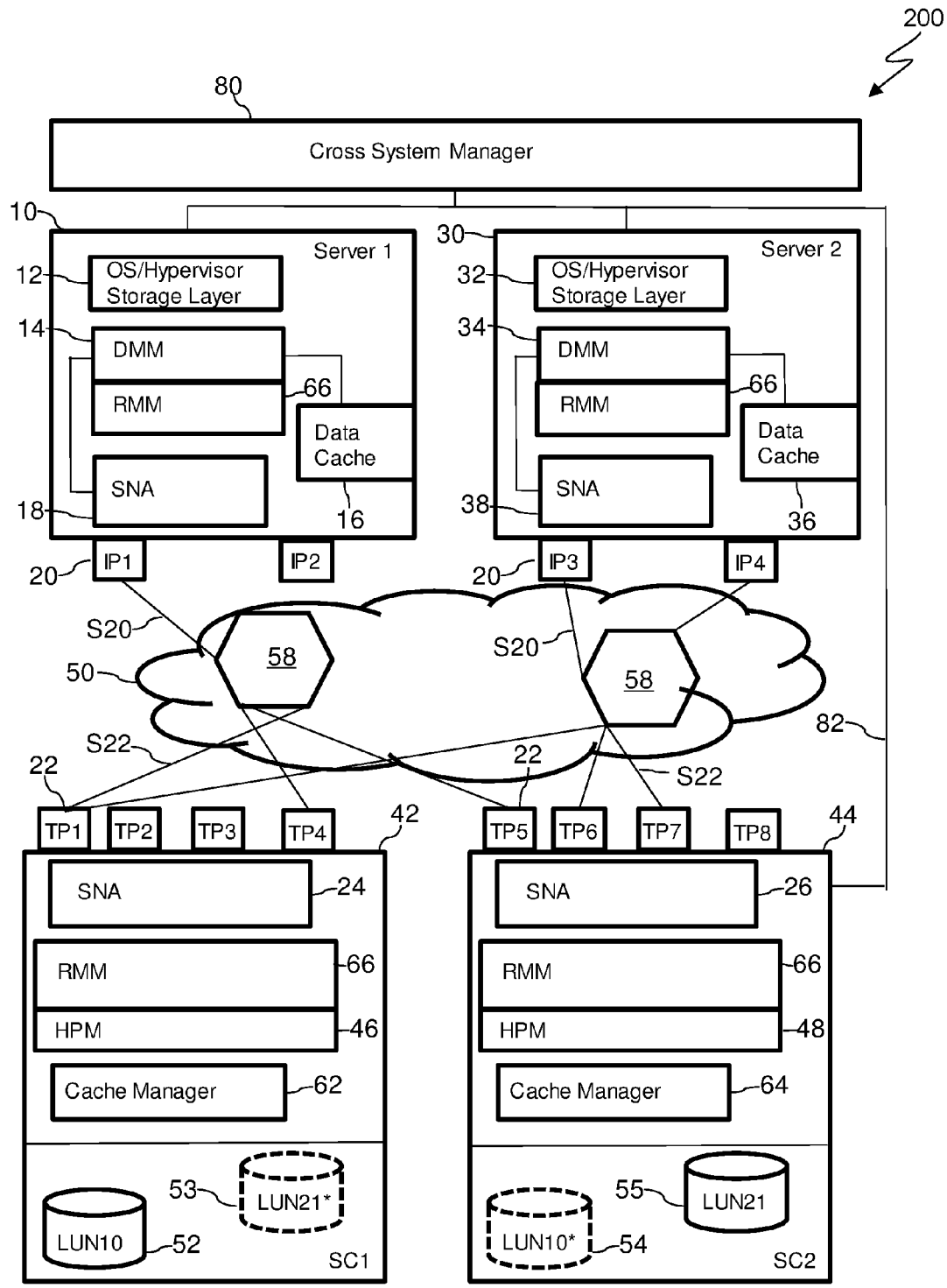
FIG. 2 is a detailed block diagram of a system 200 suitable for updating data objects using reliable multicasting in accordance with at least one embodiment of the invention.
Figure 3:
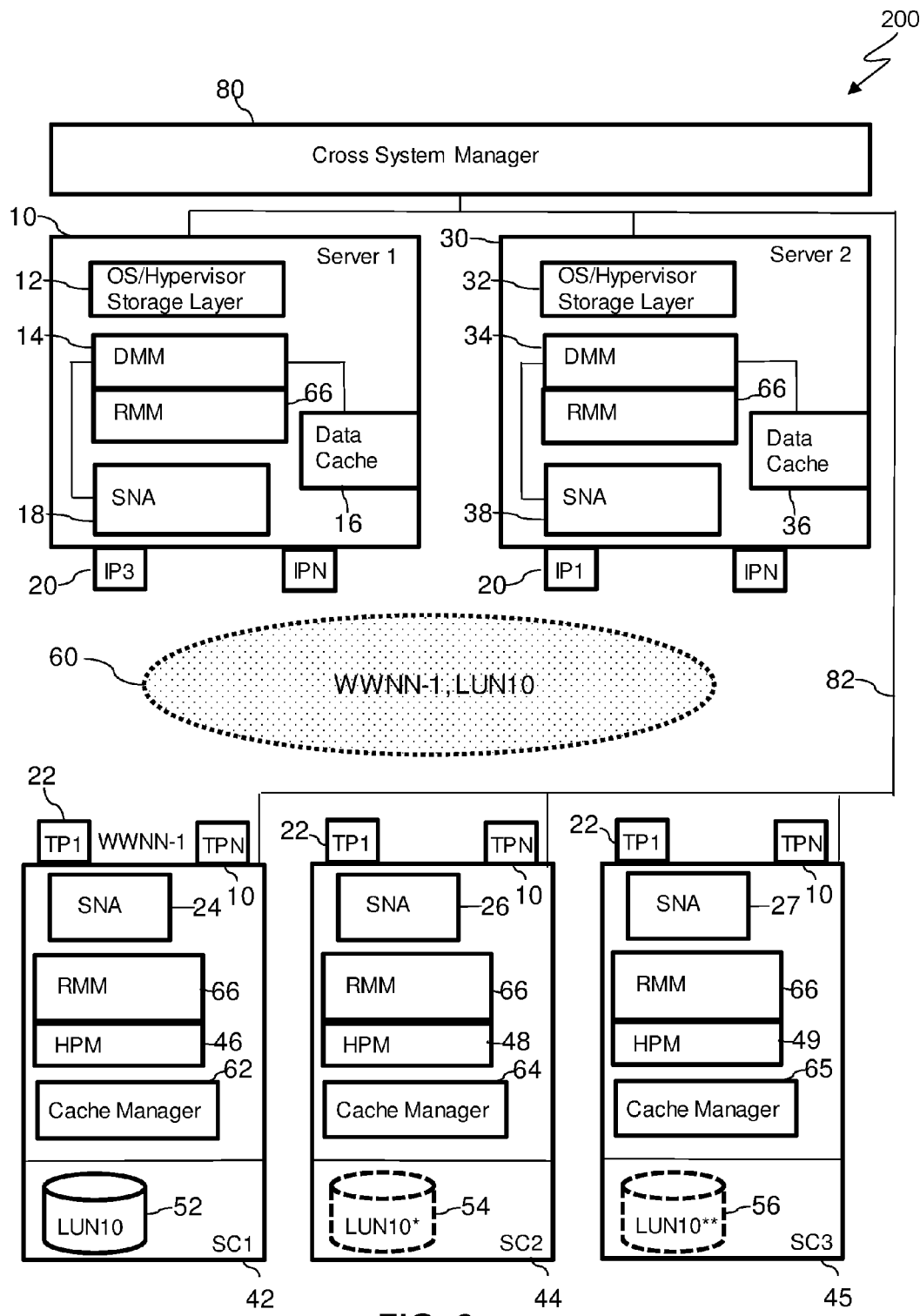
FIG. 3 is a detailed block diagram of a system 200 suitable for mirroring data objects using a multicast group in accordance with at least one embodiment of the invention.

Referring now to various embodiments of the invention in more detail, FIGS. 1 through 3 provide a computer system 200 for updating data objects. Computer system 200 includes servers 10, 30 storage controllers 42, 44 interconnected over network 50. In an embodiment of the invention, network 50 may be a multicast network. In an embodiment of the invention, a reliable multicast protocol may be added as a layer on top of the multicast network. Server 10 includes data management module 14 and server 30 includes data management module 34, wherein data management modules 14 and 34 manage data cache 16 and data cache 36, respectively. Computer system 200 further includes a cross system manager 80, wherein cross system manager 80 may control core storage functions of storage controllers 42, 44 (shown in FIG. 2).

Embodiments of the present invention may be used, in response to a core storage function triggered by cross system manager 80, for:

(i) creating a multicast group 60 for servers 10, 30 over network 50 by a reliable multicast mechanism; and
(ii) multicasting data write operations from servers 10, 30 to storage controllers 42, 44, respectively, within multicast group 60.

FIG. 1 is a block diagram of a system 200 suitable for updating data objects using multicast group 60 in accordance with at least one embodiment of the invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

System 200 includes servers 10, 30. Server 10 includes data cache 16 and data management module ("DMM") 14. Server 30 includes data cache 36 and DMM 34. In an embodiment, Servers 10, 30 may be a physical server. In an alternative embodiment, servers 10, 30 may be a virtual server. In an embodiment, data cache 16 and data cache 36 may be a solid state device.

Servers 10, 30 are interconnected to storage controllers 42, 44, respectively, of storage cluster 40, over network 50. In an embodiment of the invention, network 50 may be a storage area network ("SAN") that utilizes a fibre channel protocol ("FCP"). In an alternative embodiment of the invention, network 50 may be an SAN that utilizes an Internet protocol ("IP").

Storage controller 42 and storage controller 44 include a host port manager ("HPM") 46 and a HPM 48, respectively, as well as a storage device 52 (marked LUN 10) and a storage device 54 (marked LUN 10*), respectively. The * symbol denotes that data objects are updated from storage device 52 to storage device 54 via system 200.

Multicast group 60 includes servers 10, 3, storage controllers 52, 54. In an embodiment, multicast group 60 may be identified by a world-wide unique identifier ("WWNN) corresponding to network adapters 24 and 26, respectively. In an embodiment, multicast group 60 may be identified by a unique identifier ("UI") corresponding to storage devices 52 and 54, respectively.

According to a computer-implemented method of the present invention, multicast group 60 is created based on a target and LUN nexus (WWNN-LUN), wherein "WWNN" denotes the name of the storage controller node for its respective LUN. Servers 10 and 30 may use the LUN nexus to join multicast group 60. In the case of critical storage operations (e.g., real time migration, replication, and mirroring), a new storage controller 42, 44 may join multicast group 60. Since new storage controllers 42, 44 receive live updates from servers 10 and 30, it is not necessary to resend the modified data objects during the previously mentioned critical storage operations. Furthermore, since a reliable multicast protocol may be added as a layer on top of the multicast network, all of the data sent is guaranteed to reach all of the member of multicast group 60.

HPM 46 and HPM 48 may give priority to the data received on multicast group 60 over updates received via a bulk copy mechanism. Once the migration of data objects is complete, the original storage controllers 42 and 44 may leave multicast group 60. Here, servers 10 and 30 may continue to write to the new storage controllers 42 and 44 of multicast group 60. In the case of real time mirroring, all storage controllers 42 and 44 may remain in multicast group 60 and receive live updates. Furthermore, if servers 10 and 30 have an input/output ("I/O") cache enabled, since servers 10 and 30 are updated, the data objects also get updated with every write on multicast group 60. Thus, all updates of data objects from first server 10 to second sever 30 may be accomplished via multicast group 60 in a single step (S10). At step S10, system 200 writes data to multicast group 60, which subsequently multicasts the data to server 30, storage controller 42, and storage controller 44. The HPMs 46 and 48 give priority to data received via multicast group 60 over updates received via a bulk copy mechanism. In other words, system 200 is configured for processing data received by first storage controller 42 and/or second storage controller 44 via a multicast having a higher priority over other data received via network 50. HPMS 46 and 48 are configured for processing data traffic from multicast group 60 over data received during core storage functions since the data traffic from multicast group 60 has a higher priority.

FIG. 2 is a detailed block diagram of a system 200 suitable for updating data objects using reliable multicasting in accordance with at least one embodiment of the invention. In FIG. 2, the cross system manager 80 may be implemented as a distributed system in system 200, wherein cross system manager 80 is connected to server 10, server 30, storage controller 42, and storage controller 44 via connection 82. Host port managers 46 and 48 are implemented on first storage controller 42 and second storage controller 44, respectively, to manage their respective corresponding network adaptors 24 and 26. Storage network adapters 18, 38 and storage controllers 42, 44 include host bus adaptors 20, 22 that provide access to first server 10, second server 30, and storage devices 52, 54.

The embodiment, shown in FIG. 2, includes of a cluster of physical servers 10, 30 (server 1 and server 2) connected to a storage area network (SAN) 50 with the storage controllers 42, 44 (SC1, SC2) via a network of connectors, the host bus adapters (HBA) 20 (IP1 . . . IP4) and 22 (TP1 . . . TP8), as well as switches 58 (e.g., fibre channel switches). Data from the servers 10, 30 may be sent via the HBAs 20 via switches 58 (step S20) to the HBAs 22 (step S22). Here, storage controllers 42, 44 of SAN 50 are responsible to hold (i.e., "store") and transmit data objects to servers 10, 30. In an embodiment of the invention, each storage controller 42, 44 is physically partitioned into units. In an embodiment of the invention, each storage controller 42, 44 is logically partitioned into units. The units of each storage controller 42, 44 may be presented to servers 10, 30 as logical units (LUNs) 52, 53, 54, 55. Each LUN 52, 53, 54, 55 in storage controllers 42, 44 may be uniquely identified by a 64 bit identifier (i.e., "LUN identifier" or "LUN number"), where an asterisk symbol (*) placed after the LUN number (e.g., LUN10*, LUN21*, etc.) indicates the destination LUN for the core storage operations. The logical units may be based on any storage controller architecture types, including, but not limited to symmetric or asymmetric active-active, and asymmetric active-standby/passive.

Each storage controller 42, 44 may have a storage cache managed by a cache manager 62, 64 used to improve performance by holding frequently accessed storage objects. In an embodiment of the invention, each server 10, 30 may house an operating system 12. In an alternative embodiment, each server 10, 30 may house a hypervisor 32, respectively. Servers 10, 30 are connected to SAN 50 via network adapter (HBA) 20. In an embodiment of the invention, servers 10, 30 may include solid state drives, which are used as local data cache storages 16, 36 to improve I/O performance.

In an embodiment of the invention, the transport technology of SAN 50 may be based on a fibre channel network (FCP SAN). In an alternative embodiment, the transport technology of SAN 50 may be based on other transportation technologies, including, but not limited to an IP based SAN.

Data management modules (DMM) 14, 34 may manage I/O caches 16, 36 of servers 10, 30 and works with the reliable multicast mechanism (RMM) 66 to ship I/O to SAN 50. Host port modules (HPM) 46, 48 may manage the host facing ports of the storage controller working with the reliable multicast manager to ensure that peers get delta updates as priority from servers 10, 30 during the core storage functions involving storage controller 42 to storage controller 44 bulk data movements.

The multicast group (MCG) 60 for each storage LUN 52, 53, 54, 55, including an HBA 22 and one or more servers 10, 30 subscribing each LUN 52, 53, 54, 55 may be created. This multicast group 60 is uniquely identified in a storage domain using the World Wide Node Name (WWNN) and the LUN ID.

When a write operation at servers 10, 30 is requested to the LUN 52, 53, 54, 55, the I/O may be multicast to all members of multicast group 60, including storage controllers 42, 44 using the reliable multicast mechanism. Thus, data coherency may be maintained across multicast group 60, and consequently, storage cluster 40 as well.

FIG. 3 is a detailed block diagram of a system 200 suitable for mirroring data objects using a multicast group in accordance with at least one embodiment of the invention. In FIG. 3, system 200 is an enlarged system that includes a third storage controller 45 and corresponding devices storage network adapter 27, HPM 49, cache manager 65 and LUN 56. Furthermore, the HBAs 20 are named from IP1 to IPN, and the HBAs 22 from TP1 to TPN, where N is a natural number.

According to a computer-implemented method for mirroring data objects from server 10 to second server 30, cross system manager 80 may create multicast group 60 with the world-wide unique identifier (WWNN) of the corresponding storage network adapter 24 of the corresponding storage controller 42 of first server 10. In an alternative embodiment, cross system manager 80 may create multicast group 60 with the unique identifier (LUN) of the corresponding storage device 52 of the corresponding storage controller 42. According to the computer-implemented method, cross system manager 80 may further initiate a core storage function for mirroring, from first storage controller 42 to second storage controller 44. According to the computer-implemented method, data management module 34 of second server 30 may join multicast group 60, followed by host port manager 48 of second storage module 44. According to the computer-implemented method, once data management module 34 and host port manager 48 have joined multicast group 60, host port manager may initiate the mirroring function. According to the computer-implemented method, upon initiating the mirroring function, first server 10 may continue I/O operations to storage device 52. Furthermore, according to the computer-implemented method, data management module 14 of first server 10 multicasts the data to storage controllers 42, 44 being a member of the multicast group 60 using reliable multicasting. Accordingly to the computer-implemented method, host port manager may give priority to the data received on multicast group 60. According to the computer-implemented method, in the case of mirroring data from server 10 to server 30, first storage controller 42 stays in multicast group 60. On the other hand, in the case of migrating data from first server 10 to second server 30, first storage controller 42 leave multicast group 60. As depicted in FIG. 3, the data has been mirrored to storage devices 54, 56 (denoted by LUN 10*, and LUN 10**, respectively).

Figure 4:
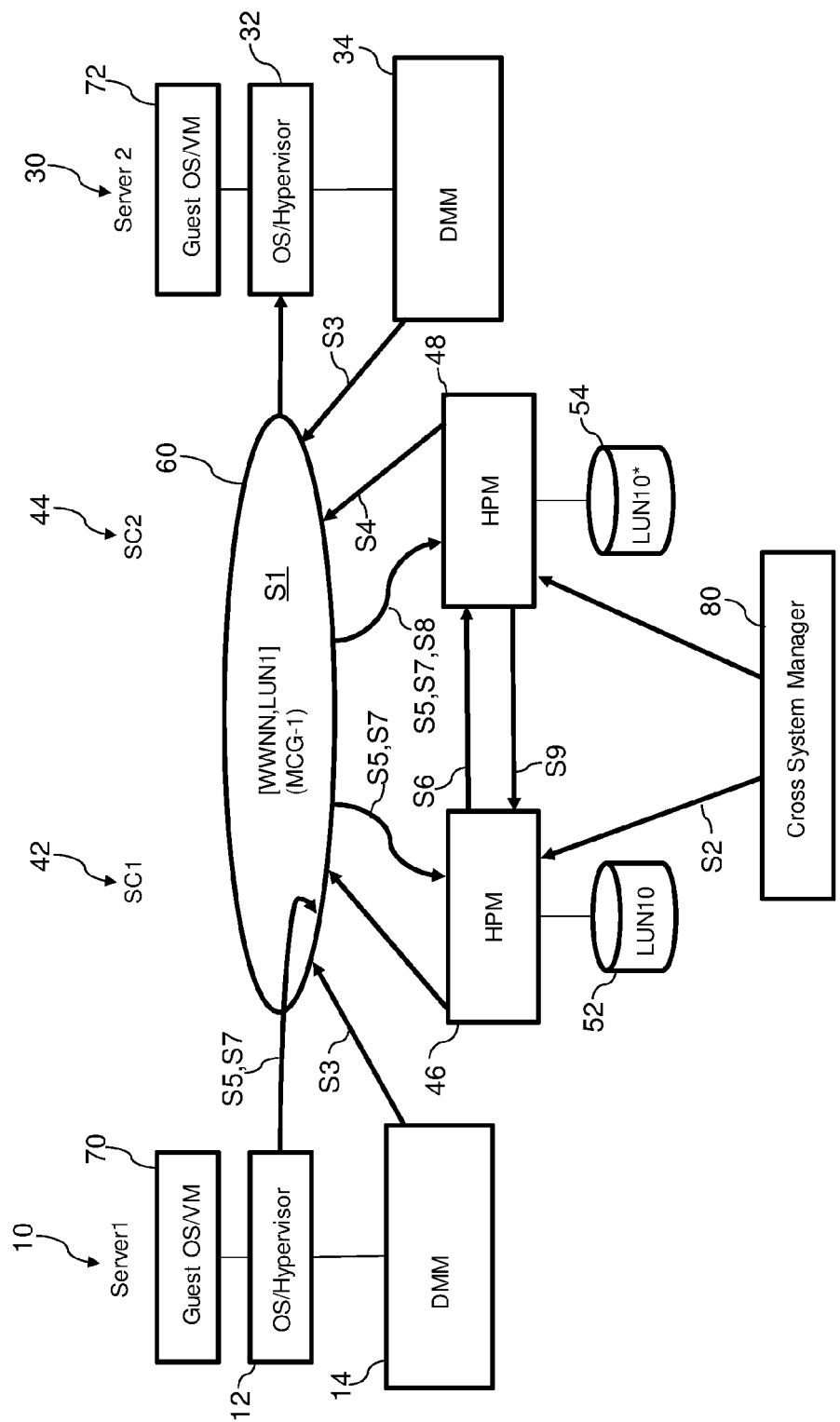
FIG. 4 is a flowchart diagram depicting a flow of events for a core storage function for mirroring data objects using a multicast group in accordance with at least one embodiment of the invention.

FIG. 4 is a flowchart diagram depicting a flow of events for a core storage function for mirroring data objects using a multicast group in accordance with at least one embodiment of the invention. At step (S1), multicast group 60 is created based on target and LUN nexus (WWNN-LUN), with the first member (WWNN) indicating the storage controller node name for its respected LUN. Once multicast group 60 is created, then host servers 10, 30 may join multicast group 60. At step (S2), cross system manager 80 may initiate the core storage function (e.g., mirroring, replication, etc.) at the source storage controller (SC1) 42, (represented by HPM 46) to migrate the data of LUN 52 to a destination storage controller (SC2) 44 (represented by HPM 48. As depicted in FIG. 4, the units are LUN10 52 to LUN10* 54 from SC1 42 to SC2 44.

At step (S3), servers 10 and 30, which are interested in the data, may join multicast group 60 via data management modules 14 and 34, respectively. At step (S4), whenever a core storage function needs to be performed, destination storage controller (SC2) 42 may join multicast group 60. At step (S5), servers 10, 30 may continue to perform I/O operations via multicast group 60 as part of its normal operation.

At step (S6), source storage SC1 42 may perform the core storage function (replication/mirroring) from LUN10 52 to LUN10* 54. At step (S7), all writes or updates from servers 10, 30 are reliably multicast to storage controllers 42, 44 in multicast group 60, thereby ensuring data object coherency. At step (S8), during the core storage function operation, HPM 48 of the destination source controller (SC2) 44 may give priority to the data received on multicast group 60 over data received directly from the source storage controller (SC1) 42. At step (S9), the core storage function from SC1 42 to SC2 44 is completed and ends. In the case of mirroring, source storage controller (SC1) 42 may remain in multicast group 60. On the other hand, in the case of migration, source storage controller (SC1) 42 may leave multicast group 60.

Figure 5:
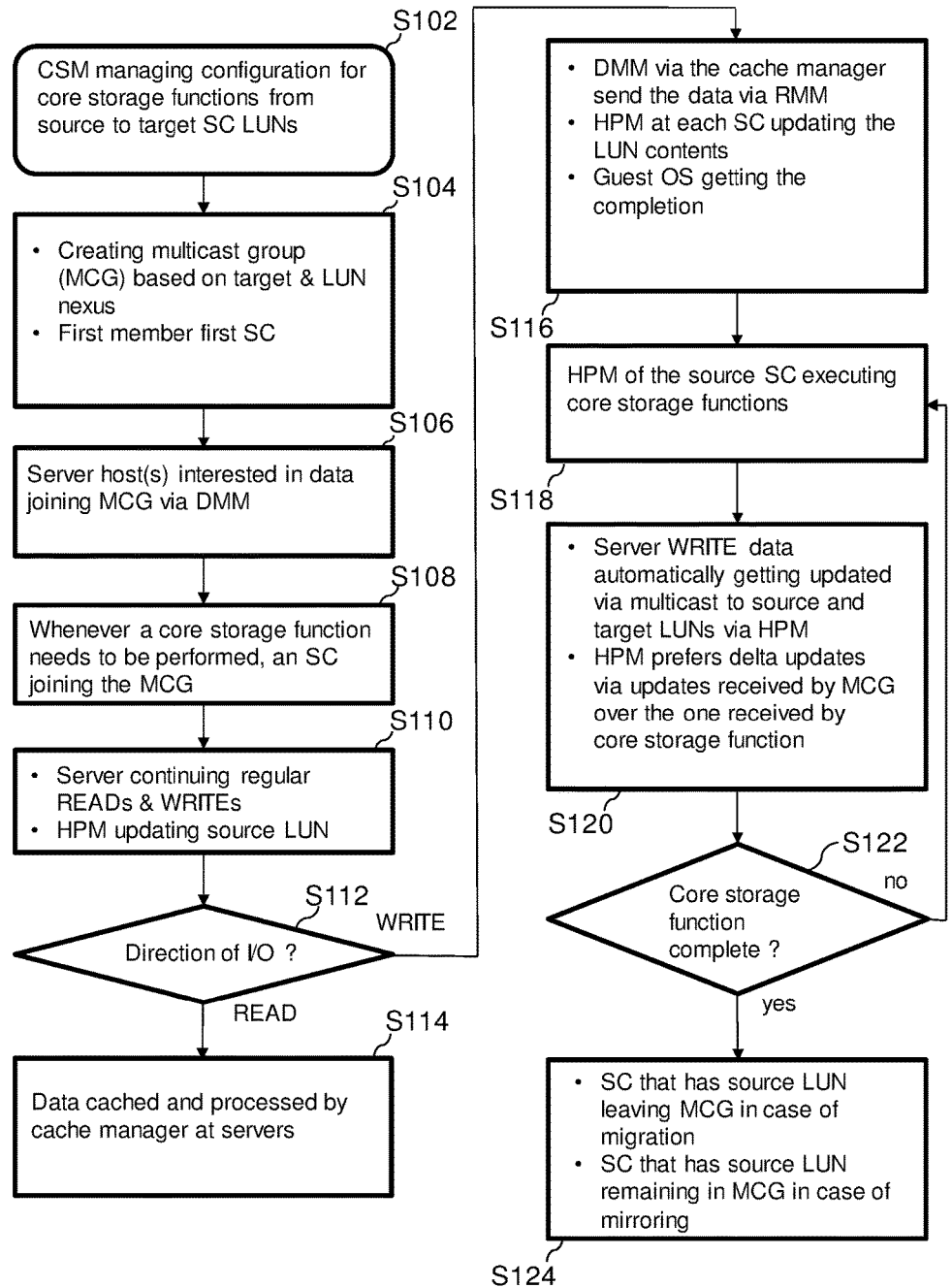
FIG. 5 is a flowchart diagram depicting operational steps for updating data objects using a multicast group in accordance with at least one embodiment of the invention.

FIG. 5 is a flowchart diagram depicting operational steps for updating data objects using a multicast group in accordance with at least one embodiment of the invention. At step (S102) cross system manager 80 may manage the configuration for the core storage functions for updating data objects from a source to a target storage controller LUN. At step (S104), multicast group 60 may be created based on the target and LUN nexus. Here, the first member of multicast group 60 is source storage controller 52. At step (S106), servers 10 and 30, which are interested the data, may join multicast group via data management modules 14 and 34, respectively. At step (S108), whenever a core storage function needs to be performed, storage controllers 42, 44 may join multicast group 60. At step (S110), servers 10 and 30 may continue with regular read/write operations. Here, HPM 46 updates the source LUN 52.

At step (S112), the direction of the input/output (i.e., read or write) operation of servers 10 and 30 may be determined. Responsive to determining a read option at step (S112), at step (S114), data is cached and processed by cache managers 62, 64 at the servers 10, 30, respectively.

On the other hand, responsive to determining a write option at step (S112), at step (S116), data management modules 14, 34 may send the data via reliable multicast via cache managers 62, 64. Furthermore, at step (S116), HPMs 46, 48 of storage controllers 42, 44, respectively, may update the contents of LUNs 52, 54. Furthermore, at step (S116), guest operating systems 12, 32 may receive a completion signal. At step (S118), HPMs 46, 48 of source storage controllers 42, 44 may execute the core storage function.

At step (S120), the write data of servers 10, 30 is automatically updated via multicasting to the source and target LUNs 52, 54 via HPMs 46, 48. Here, HPMs 46, 48 prefer delta updates via updates received by multicast group 60 over updates received by a core storage function.

At step (S122), it may be determined whether the core storage function is complete. If it is determined that the core storage function is not complete, the flow loops back to step (S118). If it is determined that the core storage function is complete for a migration case, then at step (S124), storage controllers 42, 44, including source LUN 52, 54, may leave multicast group 60. If it is determined that the core storage function is complete for a mirroring case, then at step (S124), storage controllers 42, 44, including source LUN 52, 54 may remain in multicast group 60.

Some embodiments of the present invention may include one, or more, of the following features, characteristics, operations and/or advantages: (i) a system that uses a reliable multicast group including all participating servers and storage controllers instead of separate synchronization steps between servers and storage controllers; (ii) a data management module that exploits performance and accuracies in a reliable multicast mechanism, where the system takes advantage of the high performance, unique message-to-packet mapping of the reliable multicast mechanism, which ensures a delay-free, high-speed data delivery mechanism that delivers millions of messages per second with sub-million latencies; (iii) a reliable multicast mechanism that works independently regardless of whether the transport of data is multicast or unicast; (iv) a system having a data management module, host port module and reliable multicast module that are installable components, which may be implemented in software, firmware or microcode that can coexist independently as kernel components in each server or storage controller; (v) a cross system manager that may be part of any virtualization management application which has the visibility to manage, monitor and control the virtualization aspects of the system of the present invention; (vi) a system that allows for the efficient migration, mirroring, and replication of data objects across multiple storage controllers; (vii) a system that eliminates chatter between storage controllers for live delta updates (e.g., incremental updates during the mirroring process need not be tracked and copied from a first storage controller to a second storage controller as the second storage controller is already part of the multicast group; (viii) a system that results in significant time improvements for mirroring and/or replication, especially for rapidly changing data; and (ix) a system where concurrent data objects may be updated in a steady state with optimal transactions across multiple servers and storage controllers.

Figure 6:
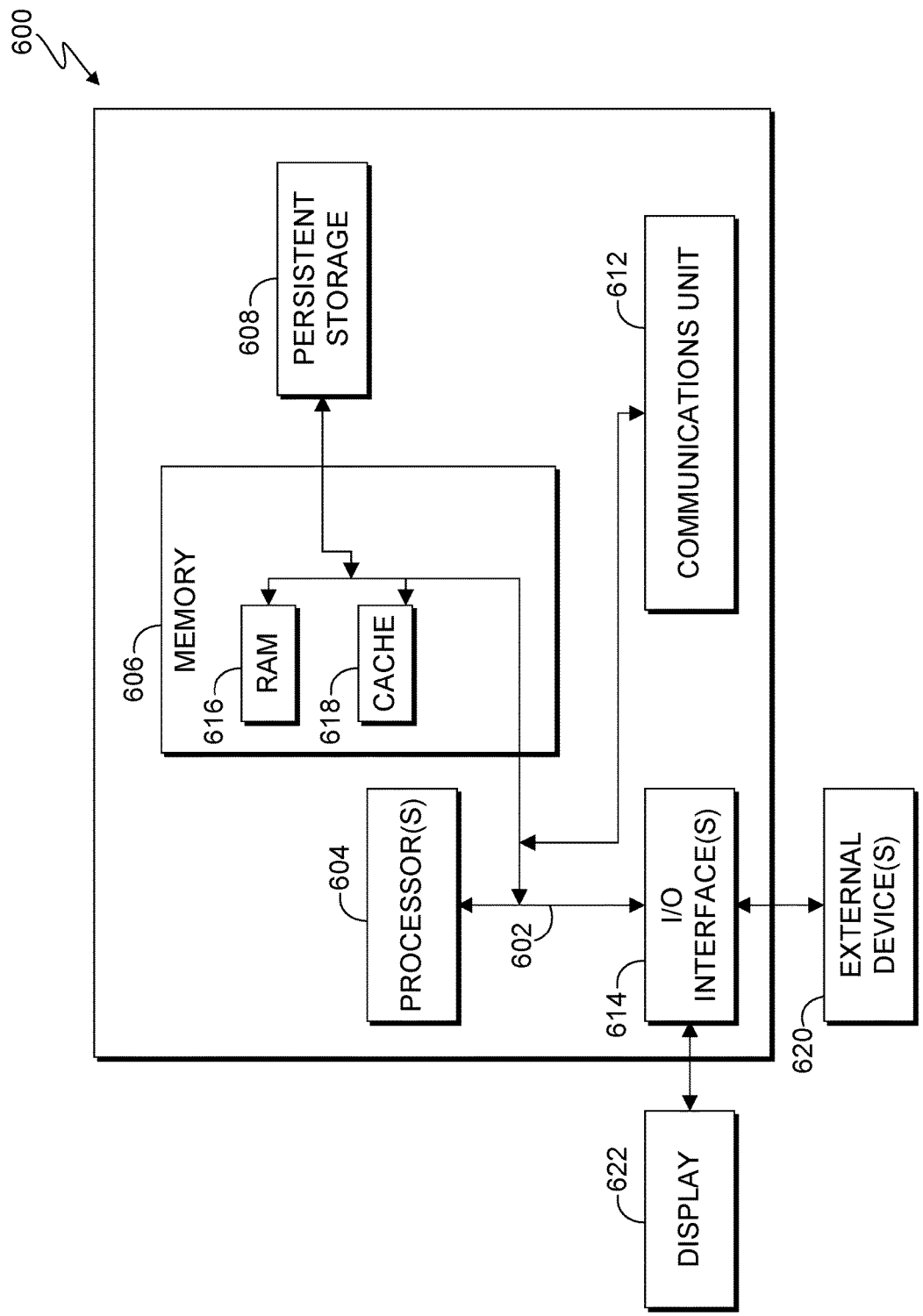
FIG. 6 is a block diagram depicting components of a computer 600 suitable for executing at least one embodiment in accordance with the present invention.

FIG. 6 is a block diagram depicting components of a computer 600 suitable for executing at least one embodiment in accordance with the present invention. FIG. 6 displays the computer 600, the one or more processor(s) 604 (including one or more computer processors), the communications fabric 602, the memory 406, the RAM 616, the cache 618, the persistent storage 608, the communications unit 612, the I/0 interfaces 614, the display 622, and the external devices 620. It should be appreciated that FIG. 6 provides only an illustration of one embodiment and does not imply any limitations with regard to the environments in which different embodiments may be implemented. Many modifications to the depicted environment may be made.

As depicted, the computer 600 operates over a communications fabric 602, which provides communications between the computer processor(s) 604, memory 606, persistent storage 608, communications unit 612, and input/output (I/O) interface(s) 614. The communications fabric 602 may be implemented with any architecture suitable for passing data or control information between the processors 604 (e.g., microprocessors, communications processors, and network processors), the memory 606, the external devices 620, and any other hardware components within a system. For example, the communications fabric 602 may be implemented with one or more buses.

The memory 606 and persistent storage 608 are computer readable storage media. In the depicted embodiment, the memory 606 comprises a random access memory (RAM) 616 and a cache 618. In general, the memory 606 may comprise any suitable volatile or non-volatile one or more computer readable storage media.

Program instructions and data used to practice embodiments of the present invention may be stored in the persistent storage in the persistent storage 608, or more generally, any computer readable storage media, for execution by one or more of the respective computer processors 604 via one or more memories of the memory 606. The persistent storage 608 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of the persistent storage 608.

The communications unit 612, in these examples, provides for communications with other data processing systems or devices. In these examples, the communications unit 612 may comprise one or more network interface cards. The communications unit 612 may provide communications through the use of either or both physical and wireless communications links. In the context of some embodiments of the present invention, the source of the various input data may be physically remote to the computer 600 such that the input data may be received and the output similarly transmitted via the communications unit 612.

The I/O interface(s) 614 allow for input and output of data with other devices that may operate in conjunction with the computer 600. For example, the I/O interface 614 may provide a connection to the external devices 620, which may be as a keyboard, keypad, a touch screen, or other suitable input devices. External devices 620 may also include portable computer readable storage media, for example thumb drives, portable optical or magnetic disks, and memory cards. Software and data used to practice embodiments of the present invention may be stored on such portable computer readable storage media and may be loaded onto the persistent storage 608 via the I/O interface(s) 614. The I/O interface(s) 614 may similarly connect to a display 622. The display 622 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for updating data objects, the computer-implemented method comprising:
    identifying, by one or more processors, a request directed to a first server to perform a first core storage function for a first data object stored on a first storage device, the first core storage function being at least one of: (i) real-time replication or (ii) real-time mirroring;
    generating, by the one or more processors, in response to identifying the request to perform the first core storage function, a multicast group that includes at least: (i) the first server, (ii) a first storage controller located on the first storage device, (iii) a second server and (iv) a second storage controller located on a second storage device;
    multicasting, by the one or more processors, a first set of data write operations associated with the first core storage function to: (i) the first storage controller, (ii) the second server and (iii) the second storage controller included in the multicast group; and
    updating, by the one or more processors, based on the first set of write operations multicasted to the multicast group: (i) the first data object stored on the first storage device and (ii) a second data object stored on the second storage device, wherein the second data object is a replica of the first data object.

2. The computer-implemented method of claim 1, further comprising:
    updating, by the one or more processors, data objects based on data write operations received by the multicast group via multicast in priority to data write operations received via a bulk copy mechanism.

3. The computer-implemented method of claim 1, wherein the multicast group is identified by at least one of: (i) a world-wide unique identifier and (ii) a unique identifier.

4. The computer-implemented method of claim 1, wherein the first server and the second server are at least one of: (i) a physical server and (ii) a virtual server.

5. The computer-implemented method of claim 1, wherein at least one of: (i) the first server and (ii) the second server include a solid state device cache.

6. The computer-implemented method of claim 1, wherein the first set of data write operations associated with the first core storage function are multicasted via a reliable multicast protocol.

7. The computer-implemented method of claim 1, wherein: (i) the first server, (ii) the first storage controller located on the first storage device, (iii) the second server and (iv) the second storage controller located on the second storage device are interconnected over a storage area network.

8. The computer-implemented method of claim 7, wherein the storage area network utilizes a fibre channel protocol.

9. The computer-implemented method of claim 7, wherein the storage area network utilizes an Internet protocol.

\* \* \* \* \*